(12) United States Patent
Kerbiriou et al.

(10) Patent No.: US 11,665,369 B2
(45) Date of Patent: May 30, 2023

(54) METHOD AND A DEVICE FOR ENCODING A SIGNAL REPRESENTATIVE OF A LIGHT-FIELD CONTENT

(71) Applicant: INTERDIGITAL CE PATENT HOLDINGS, SAS, Paris (FR)

(72) Inventors: Paul Kerbiriou, Thorigne-Fouillard (FR); Didier Doyen, La bouexiere (FR); Sebastien Lasserre, Thorigné Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 248 days.

(21) Appl. No.: 15/629,951

(22) Filed: Jun. 22, 2017

(65) Prior Publication Data

US 2017/0374388 A1    Dec. 28, 2017

(30) Foreign Application Priority Data

Jun. 22, 2016   (EP) ..................................... 16305757

(51) Int. Cl.
*H04N 19/70* (2014.01)
*H04N 19/597* (2014.01)
(Continued)

(52) U.S. Cl.
CPC ............... *H04N 19/70* (2014.11); *G06T 9/20* (2013.01); *H04N 19/132* (2014.11);
(Continued)

(58) Field of Classification Search
CPC combination set(s) only.
See application file for complete search history.

(56) References Cited

U.S. PATENT DOCUMENTS 6,097,394 A * 8/2000 Levoy .................. H04N 13/232
                                                        345/419
6,693,964 B1 * 2/2004 Zhang ..................... H04N 19/23
                                                        375/240.14
(Continued)

FOREIGN PATENT DOCUMENTS

CN       101212566 A       7/2008
CN       101438318 A       5/2009
(Continued)

OTHER PUBLICATIONS

Li et al., "Scalable Coding of Plenoptic Images by Using a Sparse Set and Disparities", Jan. 2016, IEEE Xplore, vol. 25, pp. 80-91. (Year: 2016).*

(Continued)

*Primary Examiner* — Zhiyu Lu
(74) *Attorney, Agent, or Firm* — Smadar Gefen (57) ABSTRACT

The present disclosure relates to the transmission of sets of data and metadata and more particularly to the transmission of light-field contents. Light-field data take up large amounts of storage space which makes storage cumbersome and processing less efficient. In addition, light-field acquisition devices are extremely heterogeneous and each camera has its own proprietary file format. Since acquired light-field data from different cameras have a diversity of formats a complex processing is induced on the receiver side. To this end, it is proposed a method for encoding a signal representative of a light-field content in which the parameters representing the rays of light sensed by the different pixels of the sensor are mapped on the sensor. A second set of encoded parameters are used to reconstruct the light-field content from the parameters representing the rays of light sensed by the different pixels of the sensor.

20 Claims, 6 Drawing Sheets

(51) Int. Cl.

| | |
|---|---|
| H04N 19/463 | (2014.01) |
| H04N 19/593 | (2014.01) |
| H04N 19/59 | (2014.01) |
| H04N 19/132 | (2014.01) |
| H04N 19/167 | (2014.01) |
| H04N 19/186 | (2014.01) |
| H04N 19/44 | (2014.01) |
| G06T 9/20 | (2006.01) |

(52) U.S. Cl.
CPC ......... *H04N 19/167* (2014.11); *H04N 19/186* (2014.11); *H04N 19/44* (2014.11); *H04N 19/463* (2014.11); *H04N 19/59* (2014.11); *H04N 19/593* (2014.11); *H04N 19/597* (2014.11)

(56) References Cited

U.S. PATENT DOCUMENTS

| | | | | |
|---|---|---|---|---|
| 8,749,620 | B1* | 6/2014 | Knight | H04N 13/211 348/49 |
| 9,582,922 | B2* | 2/2017 | Lanman | G02B 27/017 |
| 9,961,333 | B1* | 5/2018 | Adolf | G02B 30/50 |
| 2004/0125103 | A1* | 7/2004 | Kaufman | G06T 15/08 345/419 |
| 2007/0229653 | A1 | 10/2007 | Matusik et al. | |
| 2008/0152215 | A1 | 6/2008 | Horie et al. | |
| 2010/0003024 | A1* | 1/2010 | Agrawal | H04N 5/2254 396/340 |
| 2010/0265385 | A1* | 10/2010 | Knight | H04N 9/8205 348/340 |
| 2013/0113981 | A1* | 5/2013 | Knight | G02B 27/0075 348/345 |
| 2013/0307931 | A1 | 11/2013 | Bronstein et al. | |
| 2013/0321581 | A1* | 12/2013 | El-Ghoroury | H04N 23/815 348/340 |
| 2014/0003505 | A1* | 1/2014 | Lainema | H04N 19/30 375/240.12 |
| 2014/0003732 | A1 | 1/2014 | Le et al. | |
| 2014/0071231 | A1 | 3/2014 | Joseph | |
| 2014/0232822 | A1 | 8/2014 | Venkataraman et al. | |
| 2014/0362159 | A1* | 12/2014 | Zhai | H04N 7/141 348/14.01 |
| 2014/0376826 | A1 | 12/2014 | Venkataraman et al. | |
| 2015/0125093 | A1* | 5/2015 | Jeong | G06T 5/005 382/284 |
| 2015/0312593 | A1 | 10/2015 | Akeley et al. | |
| 2016/0212443 | A1* | 7/2016 | Liang | H04N 19/147 |

FOREIGN PATENT DOCUMENTS

| | | |
|---|---|---|
| CN | 102282590 A | 12/2011 |
| EP | 2835969 A1 | 2/2015 |
| JP | 2014086968 A | 5/2014 |
| RU | 2331919 C2 | 8/2008 |

OTHER PUBLICATIONS

Magnor et al., "Adaptive Block-based Light Field Coding", 1999, CiteSeer, http://citeseerx.ist.psu.edu/viewdoc/download?doi=10.1.1.33.3615&rep=rep1&type=pdf (Year: 1999).*

Anonymous, "Technical Report of the Joint Ad Hoc Group for Digital Representations of Light/Sound Fields for Immersive Media Applications", International Organization for Standardization, ISO/IEC JTC1/SC29/WG1N72033, ISO/IEC JTC1/SC29/WG11N16352, Geneva, Switzerland, Jun. 2016, pp. 1-79.

Schumpert et al., "A Two-Component Image Coding Scheme Based on Two-Dimensional Interpolation and the Discrete Cosine Transform", IEEE International Conference on Acoustics, Speech and Signal Processing, Boston, Massachusetts, USA, Apr. 14, 1983, pp. 1232-1235.

Shi et al., "Chapter 3, Differential coding", Image and Video Compression for Multimedia Engineering, Fundamentals, Algorithms, and Standards, CRC Press, Boca Raton, 2000, pp. 55-73.

Hartley et al., "Chapter 6, Camera Models", Multiple View Geometry in Computer Vision, Second Edition, Cambridge University Press, New York, 2004, pp. 153-177.

Scarmana, "Lossless Data Compression of Grid-Based Digital Elevation Models: A PNG Image Format Evaluation", ISPRS Technical Commission V Symposium, Riva del Garda, Italy, Jun. 23, 2014, pp. 313-319.

Levin et al., "Understanding camera trade-offs through a Bayesian analysis of light field projections", 10th European Conference on Computer Vision, Marseille, France, Oct. 12, 2008, pp. 88-101.

Ng, "Digital Light Field Photography", Doctoral Dissertation, Stanford University, Department of Computer Science, Jul. 2006, pp. 1-203.

Wanner et al., "Generating EPI Representations of 4D Light Fields with a Single Lens Focused Plenoptic Camera", International Symposium on Advances in Visual Computing, Las Vegas, Nevada, USA, Sep. 26, 2011, pp. 90-101.

Bourge et al., "MPEG Auxiliary Video Data Representations", Moving Picture Experts Group C Standard, 3D Video Coding, Part 3, Document No. N8039, Apr. 2006, pp. 1-3.

RU2331919 C2 TR EN Machine Dec. 23, 2020.

"Technical report of the joint ad hoc group for digital representations of light/sound fields for immersive media applications," International Organisation for Standardisation Organisation Internationale De Normalisation ISO/IEC JTC1/SC29/WG1(JPEG) & WG11(MPEG), ISO/IEC JTC1/SC29/WG11N16352, pp. 13-15, 34-35, 44-45.

J. M. Schumpert et al., "A two-component image coding scheme based on two-dimensional interpolation and the discrete cosine transform," ICASSP '83. IEEE International Conference on Acoustics, Speech, and Signal Processing, pp. 1232-1235, Apr. 14, 1983.

Yun, Q et al., "Differential Coding (Chapter 3)", Image and Video Compression for Multimedia Engineering Fundamentals, Algorithms, and Standards, CRC Press, pp. 63-64, Jan. 1, 2000.

Anonymous, "Technical Report of the Joint Ad Hoc Group for Digital Representations of Light/Sound Fields for Immersive Media Applications", International Organization for Standardization, ISO/IEC JTC1/SC29/WG01 & WG11, Document ISO/IEC JTC1/SC29/WG11 m38503, Geneva, Switzerland, May 2016, 82 pages.

Schumpert et al.; "A two-component image coding scheme based on two-dimensional interpolation and the discrete cosine transform", IEEE, ICASSP 83, Boston, 1983, 4 pages.

Hartley, et al., "Multiple View Geometry in Computer Vision", Second Edition, Cambridge University Press, Cambridge, UK, 2004, pp. 1-673.

Ren Ng, et al., "Light Field Photography with a Hand-held Plenoptic Camera", Stanford Tech Report CTSR Feb. 2005, 11 pages.

* cited by examiner

METHOD AND A DEVICE FOR ENCODING A SIGNAL REPRESENTATIVE OF A LIGHT-FIELD CONTENT

REFERENCE TO RELATED EUROPEAN APPLICATION

This application claims priority from European No. 16305757.3, entitled "A METHOD AND A DEVICE FOR ENCODING A SIGNAL REPRESENTATIVE OF A LIGHT-FIELD CONTENT," filed on Jun. 22, 2016, the contents of which are hereby incorporated by reference in its entirety.

TECHNICAL FIELD

The present invention relates to the transmission of sets of data and metadata and more particularly to the transmission of light-field contents.

BACKGROUND

The acquisition of four-dimensional or 4D light-field data, which can be viewed as a sampling of a 4D light field, i.e. the recording of light rays, is explained in the article "Understanding camera trade-offs through a Bayesian analysis of light field projections" by Anat Levin and al., which has been published in the conference proceedings of ECCV 2008.

Compared to classical two-dimensional or 2D images obtained from a camera, 4D light-field data enable a user to have access to more post-processing features that enhance the rendering of images and the interactivity with the user. For example, with 4D light-field data, it is possible to perform refocusing of images with freely selected distances of focalization meaning that the position of a focal plane can be specified/selected a posteriori, as well as changing slightly the point of view in the scene of an image.

There are several ways to represent 4D light-field data. Indeed, in the Chapter 3.3 of the Ph.D dissertation thesis entitled "Digital Light Field Photography" by Ren Ng, published in July 2006, three different ways to represent 4D light-field data are described. Firstly, 4D light-field data can be represented, when recorded by a plenoptic camera by a collection of micro-lens images. 4D light-field data in this representation are named raw images or raw 4D light-field data. Secondly, 4D light-field data can be represented, either when recorded by a plenoptic camera or by a camera array, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light-field data can be represented by a set of epipolar images see for example the article entitled: "Generating EPI Representation of a 4D Light Fields with a Singe Lens Focused Plenoptic Camera", by S. Wanner and al., published in the conference proceedings of ISVC 2011.

Light-field data take up large amounts of storage space which makes storage cumbersome and processing less efficient. In addition, light-field acquisition devices are extremely heterogeneous. Light-field cameras are of different types for example plenoptic or camera arrays. Within each type there are many differences such as different optical arrangements, or micro-lenses of different focal lengths. Each camera has its own proprietary file format. At present, there is no standard supporting the acquisition and transmission of multi-dimensional information for an exhaustive over-view of the different parameters upon which a light-field depends. Since acquired light-field data from different cameras have a diversity of formats a complex processing is induced on the receiver side.

The present invention has been devised with the foregoing in mind.

SUMMARY OF INVENTION

According to a first aspect of the invention there is provided a computer implemented method for encoding a signal representative of a light-field content said method comprising:
 encoding, for at least one pixel of a sensor, a first set of parameters representing a ray of light sensed by said pixel,
 encoding a second set of parameters intended to be used to reconstruct the light-field content from the first set of parameters.

The parameters transmitted according to the encoding method according to an embodiment of the invention are independent of the optical acquisition system used to acquire the light-field content intended to be transmitted and processed by a receiving device.

In the method, according to an embodiment of the invention, the parameters representing the rays of light sensed by the different pixels of the sensor of the optical acquisition system, i.e. the parameters of the first set of parameters, are mapped on the sensor. Thus, these parameters can be considered as pictures. For example, when a ray of light sensed by a pixel of the optical acquisition system is represented by four parameters, the parameters representing the rays of light sensed by the pixels of the sensor of the optical acquisition system are grouped in four pictures.

Such pictures can be encoded and transmitted according to video standards such as MPEG-4 part 10 AVC (also called h264), h265/HEVC or their probable successor h266, and transmitted in a joined video bitstream. The second encoded set may be encoded using Supplemental enhancement information (SEI) messages. The format defined in the method according to an embodiment of the invention enables a strong compression of the data to be transmitted without introducing any strong error (lossless coding) or a limited amount of errors (lossy coding).

The method according to an embodiment of the invention is not limited to light-field data directly acquired by an optical device. These data may be Computer Graphics Image (CGI) that are totally or partially simulated by a computer for a given scene description. Another source of light-field data may be post-produced data that are modified, for instance color graded, light-field data obtained from an optical device or CGI. It is also now common in the movie industry to have data that are a mix of both data acquired using an optical acquisition device, and CGI data. It is to be understood that the pixel of a sensor can be simulated by a computer-generated scene system and, by extension, the whole sensor can be simulated by said system. From here, it is understood that any reference to a "pixel of a sensor" or a "sensor" can be either a physical object attached to an optical acquisition device or a simulated entity obtained by a computer-generated scene system.

According to an embodiment of the encoding method, said encoding method further comprises:
 encoding a third set of parameters representing color data associated to the ray of light represented by said first set of parameters.

According to an embodiment of the encoding method, at least one parameter of the first set of parameters represents a distance between a coordinate of said ray of light and a plane fitting a set of coordinates of a plurality of rays of light sensed by a plurality of pixels of the optical acquisition system, and at least one parameter of the second set of parameters represents coordinates of the fitting plane.

Encoding the distance between a coordinate of the ray of light and a plane fitting a set of coordinates of a plurality of rays of light sensed by the different pixels of the sensor enables compressing the data to be transmitted since the amplitude between the different values of the computed distances is usually lower than the amplitude between the different values of the coordinates.

According to an embodiment of the encoding method, at least one parameter of the first set of parameters represents:
  a difference between a value representing the ray of light sensed by said pixel and a value representing a ray of light sensed by another pixel preceding said pixel in a row of the sensor, or
  when said pixel is the first pixel of a row of the sensor, a difference between a value representing the ray of light sensed by said pixel and a value representing a ray of light sensed by the first pixel of a row preceding the row to which said pixel belongs.

The value representing the ray of light could be either the coordinates representing the ray of light or the distance between the coordinates or planes fitting sets of coordinates of a plurality of rays of light sensed by the different pixels of the sensor.

This enables compressing the data by reducing the amplitude between the different values of the parameters to be transmitted.

According to an embodiment of the encoding method, independent codecs are used to encode the parameters of the first set of parameters.

According to an embodiment of the encoding method, when the second set of parameters comprises a parameter indicating that the first set of parameters is unchanged since a last transmission of the first set of parameters, only said second set of parameters is transmitted.

This enables to reduce the amount of data to be transmitted to the decoding devices.

According to an embodiment of the encoding method, the light-field data is made of a sequence of subsets of light-field data. For instance, the sub-sets are indexed temporally in order to represent a dynamic or moving scene. Typically, an element (or sub-set) of the sequence is called a frame. Under this condition, the transmission rate, usually characterized by, but no limited to, a number of frames per second, of the signal representative of the light-content is higher than the transmission rate of the encoded first set of parameters and the encoded second set of parameters.

This enables to reduce the amount of data to be transmitted to the decoding devices.

Another object of the invention concerns a device for encoding a signal representative of a light-field content comprising a processor configured to:
  encode, for at least one pixel of a sensor, a first set of parameters representing a ray of light sensed by said pixel,
  encode a second set of parameters intended to be used to reconstruct the light-field content from the first set of parameters.

Another aspect of the invention concerns a computer implemented method for decoding a signal representative of a light-field content said method comprising
  decoding, for at least one pixel of a sensor, a first set of parameters representing a ray of light sensed by said pixel,
  decoding a second set of parameters intended to be used to reconstruct the light-field content from the first set of parameters,
  reconstructing the light-field content based on the decoded first set of parameters and the decoded second set of parameters.

According to an embodiment of the decoding method, said encoding method further comprises:
  decoding a third set of parameters representing color data associated to the ray of light represented by said first set of parameters,
  reconstructing the light-field content based on a decoded third set of parameters together with the decoded first set of parameters and the decoded second set of parameters.

Another aspect of the invention concerns a device for decoding a signal representative of a light-field content comprising a processor configured to:
  decode, for at least one pixel of a sensor, a first set of parameters representing a ray of light sensed by said pixel,
  decode a second set of parameters intended to be used to reconstruct the light-field content from the first set of parameters,
  reconstruct the light-field content based on the decoded first set of parameters and the decoded second set of parameters.

Another aspect of the invention concerns a signal transmitted by a device for encoding a signal representative of a light-field content to a device for decoding said signal representative of a light-field content, said signal carrying a message comprising
  a first set of parameters representing a ray of light sensed by at least one pixel of a sensor,
  a second set of parameters intended to be used to reconstruct the light-field content from the first set of parameters,
  the reconstruction of the light-field content by the decoding device is based on a decoded first set of parameters and a decoded second set of parameters.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium (a) may be utilized.

Embodiments of the invention provide formatting of light-field data for further processing applications such as format conversion, refocusing, viewpoint change, etc. The provided formatting enables a proper and easy reconstruction of the light-field data on the receiver side in order to process it. An advantage of the provided format is that it is agnostic to the device used to acquire the light-field data.

Figure 1:
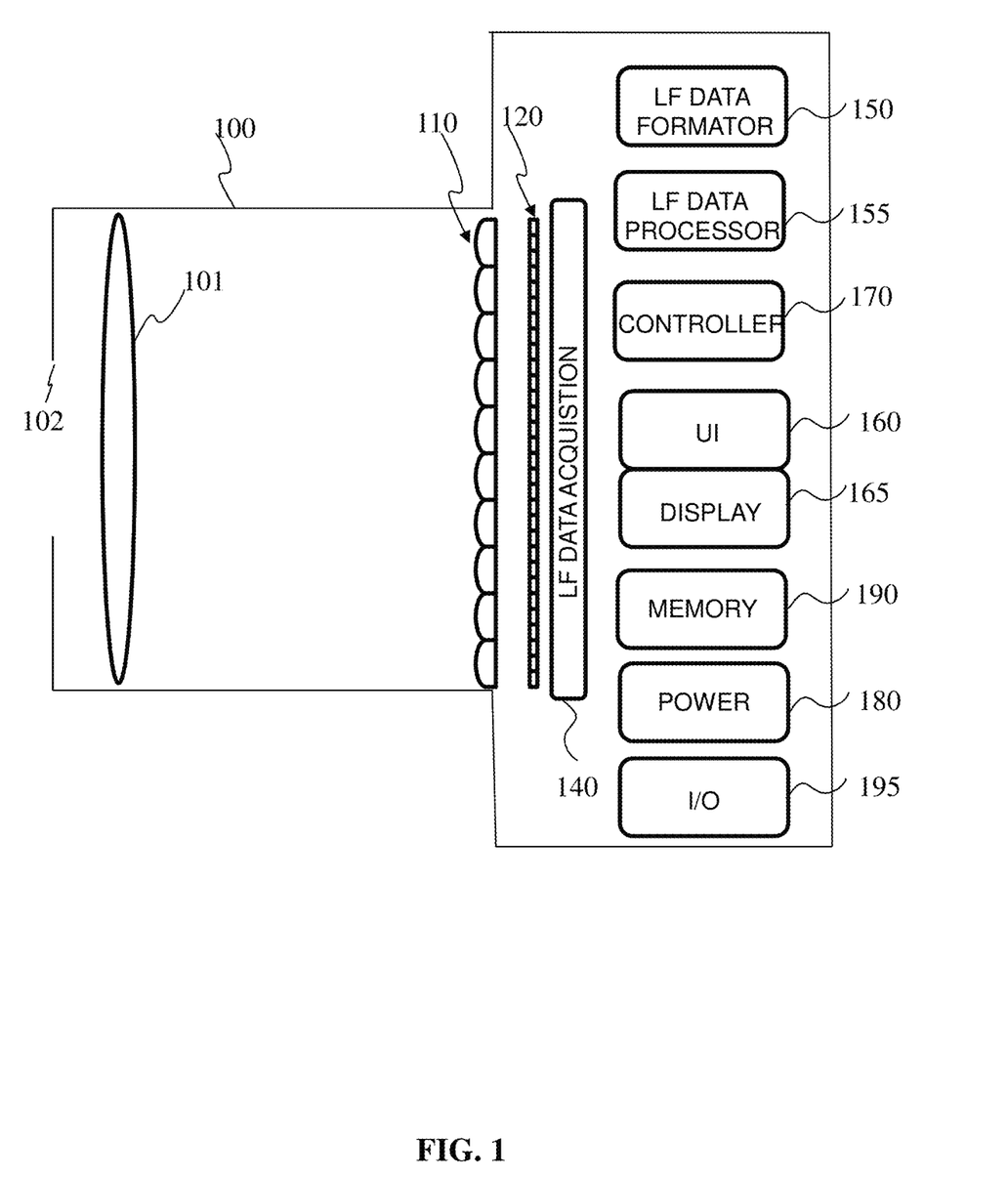
FIG. 1 is a block diagram of a light-field camera device in accordance with an embodiment of the invention.

FIG. 1 is a block diagram of a light-field camera device in accordance with an embodiment of the invention. The light-field camera comprises an aperture/shutter 102, a main (objective) lens 101, a micro lens array 110 and a photosensor array. In some embodiments, the light-field camera includes a shutter release that is activated to capture a light-field image of a subject or scene.

The photosensor array 120 provides light-field image data which is acquired by LF Data acquisition module 140 for generation of a light-field data format by light-field data formatting module 150 and/or for processing by light-field data processor 155. Light-field data may be stored, after acquisition and after processing, in memory 190 in a raw data format, as sub aperture images or focal stacks, or in a light-field data format in accordance with embodiments of the invention.

In the illustrated example, the light-field data formatting module 150 and the light-field data processor 155 are disposed in or integrated into the light-field camera 100. In other embodiments of the invention the light-field data formatting module 150 and/or the light-field data processor 155 may be provided in a separate component external to the light-field capture camera. The separate component may be local or remote with respect to the light-field image capture device. It will be appreciated that any suitable wired or wireless protocol may be used for transmitting light-field image data to the formatting module 150 or light-field data processor 155; for example, the light-field data processor may transfer captured light-field image data and/or other data via the Internet, a cellular data network, a WiFi network, a Bluetooth® communication protocol, and/or any other suitable means.

The light-field data formatting module 150 is configured to generate data representative of the acquired light-field, in accordance with embodiments of the invention. The light-field data formatting module 150 may be implemented in software, hardware or a combination thereof.

The light-field data processor 155 is configured to operate on raw light-field image data received directly from the LF data acquisition module 140 for example to generate formatted data and metadata in accordance with embodiments of the invention. Output data, such as, for example, still images, 2D video streams, and the like of the captured scene may be generated. The light-field data processor may be implemented in software, hardware or a combination thereof.

In at least one embodiment, the light-field camera 100 may also include a user interface 160 for enabling a user to provide user input to control operation of camera 100 by controller 170. Control of the camera may include one or more of control of optical parameters of the camera such as shutter speed, or in the case of an adjustable light-field camera, control of the relative distance between the microlens array and the photosensor, or the relative distance between the objective lens and the microlens array. In some embodiments, the relative distances between optical elements of the light-field camera may be manually adjusted. Control of the camera may also include control of other light-field data acquisition parameters, light-field data formatting parameters or light-field processing parameters of the camera. The user interface 160 may comprise any suitable user input device(s) such as a touchscreen, buttons, keyboard, pointing device, and/or the like. In this way, input received by the user interface can be used to control and/or configure the LF data formatting module 150 for controlling the data formatting, the LF data processor 155 for controlling the processing of the acquired light-field data and controller 170 for controlling the light-field camera 100.

The light-field camera includes a power source 180, such as one or more replaceable or rechargeable batteries. The light-field camera comprises memory 190 for storing captured light-field data and/or processed light-field data or other data such as software for implementing methods of embodiments of the invention. The memory can include external and/or internal memory. In at least one embodiment, the memory can be provided at a separate device and/or location from camera 100. In one embodiment, the memory includes a removable/swappable storage device such as a memory stick.

The light-field camera may also include a display unit 165 (e.g., an LCD screen) for viewing scenes in front of the camera prior to capture and/or for viewing previously captured and/or rendered images. The screen 165 may also be used to display one or more menus or other information to the user. The light-field camera may further include one or more I/O interfaces 195, such as FireWire or Universal Serial Bus (USB) interfaces, or wired or wireless communication interfaces for data communication via the Internet, a cellular data network, a WiFi network, a Bluetooth® communication protocol, and/or any other suitable means. The I/O interface 195 may be used for transferring data, such as light-field representative data generated by LF data formatting module in accordance with embodiments of the invention and light-field data such as raw light-field data or data processed by LF data processor 155, to and from external devices such as computer systems or display units, for rendering applications.

Figure 2:
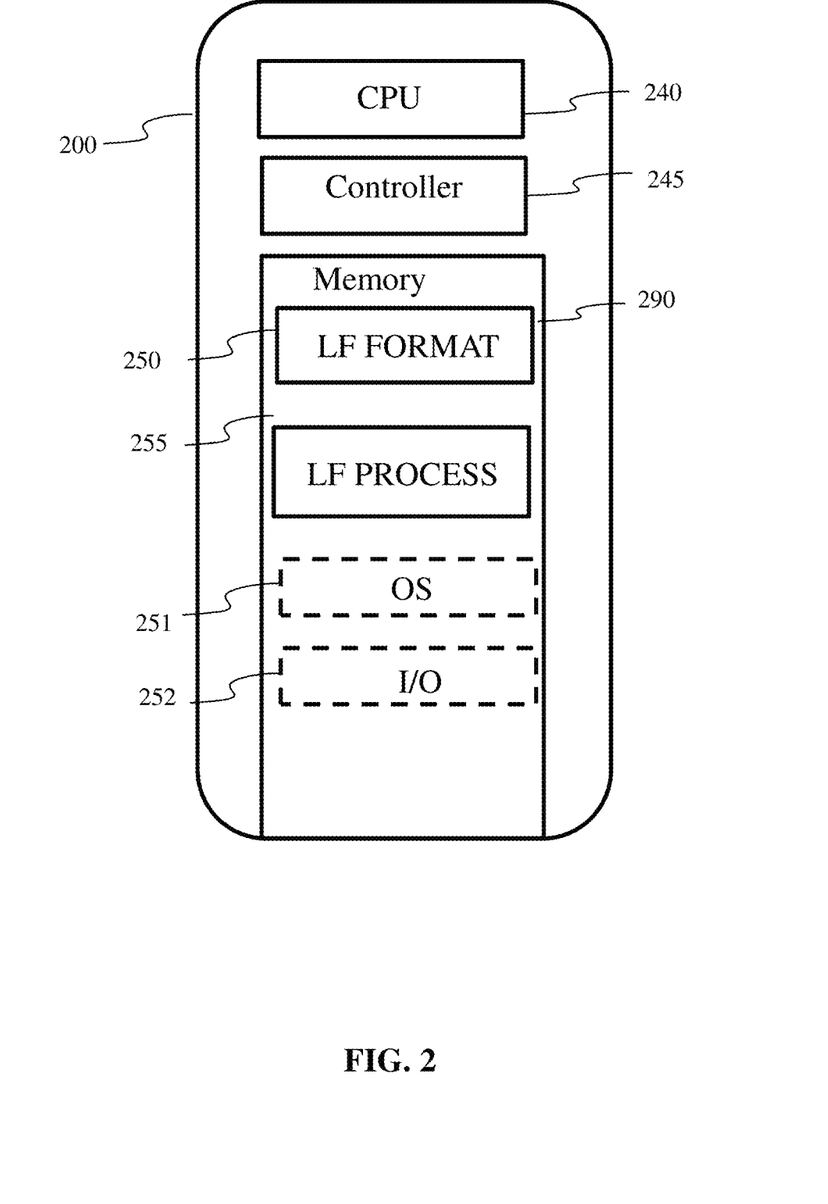
FIG. 2 is a block diagram illustrating a particular embodiment of a potential implementation of light-field data formatting module.

FIG. 2 is a block diagram illustrating a particular embodiment of a potential implementation of light-field data formatting module 250 and the light-field data processor 253.

The circuit 200 includes memory 290, a memory controller 245 and processing circuitry 240 comprising one or more processing units (CPU(s)). The one or more processing units 240 are configured to run various software programs and/or sets of instructions stored in the memory 290 to perform various functions including light-field data formatting and light-field data processing. Software components stored in the memory include a data formatting module (or set of instructions) 250 for generating data representative of acquired light data in accordance with embodiments of the invention and a light-field data processing module (or set of instructions) 255 for processing light-field data in accordance with embodiments of the invention. Other modules may be included in the memory for applications of the light-field camera device such as an operating system module 251 for controlling general system tasks (e.g. power management, memory management) and for facilitating communication between the various hardware and software components of the device 200, and an interface module 252 for controlling and managing communication with other devices via I/O interface ports.

Embodiments of the invention provide a representation of light-field data based on rays of light sensed by the pixels of the sensor of a camera or simulated by a computer-generated scene system. Indeed, another source of light-field data may be post-produced data that are modified, for instance color graded, light-field data obtained from an optical device or CGI. It is also now common in the movie industry to have data that are a mix of both data acquired using an optical acquisition device, and CGI data. It is to be understood that the pixel of a sensor can be simulated by a computer-generated scene system and, by extension, the whole sensor can be simulated by said system. From here, it is understood that any reference to a "pixel of a sensor" or a "sensor" can be either a physical object attached to an optical acquisition device or a simulated entity obtained by a computer-generated scene system.

Knowing that whatever the type of acquisition system, to a pixel of the sensor of said acquisition system corresponds at least a linear light trajectory, or ray of light, in space outside the acquisition system, data representing the ray of light in a three-dimensional (or 3D) space are computed.

Figure 3:
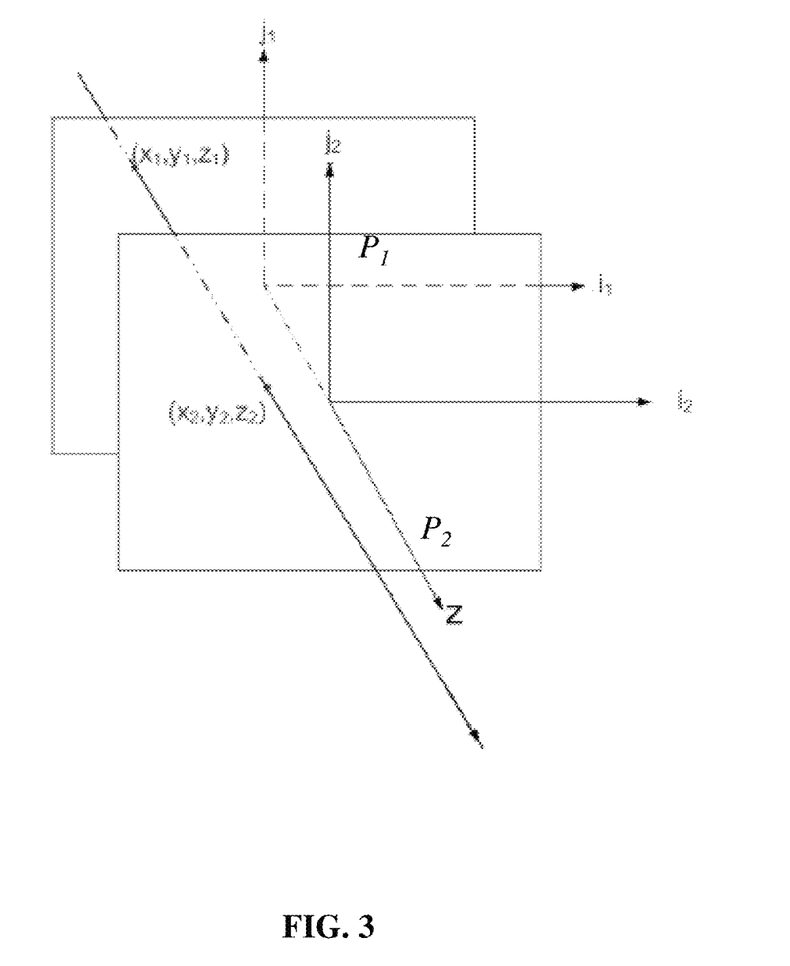
FIG. 3 illustrates a ray of light passing through two reference planes $P_1$ and $P_2$ used for parameterization.

In a first embodiment, FIG. 3 illustrates a ray of light passing through two reference planes $P_1$ and $P_2$ used for parameterization positioned parallel to one another and located at known depths $z_1$ and $z_2$ respectively. The ray of light intersects the first reference plane $P_1$ at depth $z_1$ at intersection point $(x_1, y_1)$ and intersects the second reference plane $P_2$ at depth $z_2$ at intersection point $(x_2, y_2)$. In this way, given $z_1$ and $z_2$, the ray of light can be identified by four coordinates $(x_1, y_1, x_2, y_2)$. The light-field can thus be parameterized by a pair of reference planes for parameterization $P_1$, $P_2$ also referred herein as parametrization planes, with each ray of light being represented as a point $(x_1, y_1, x_2, y_2,) \in \mathbb{R}^4$ in 4D ray space.

Figure 4:
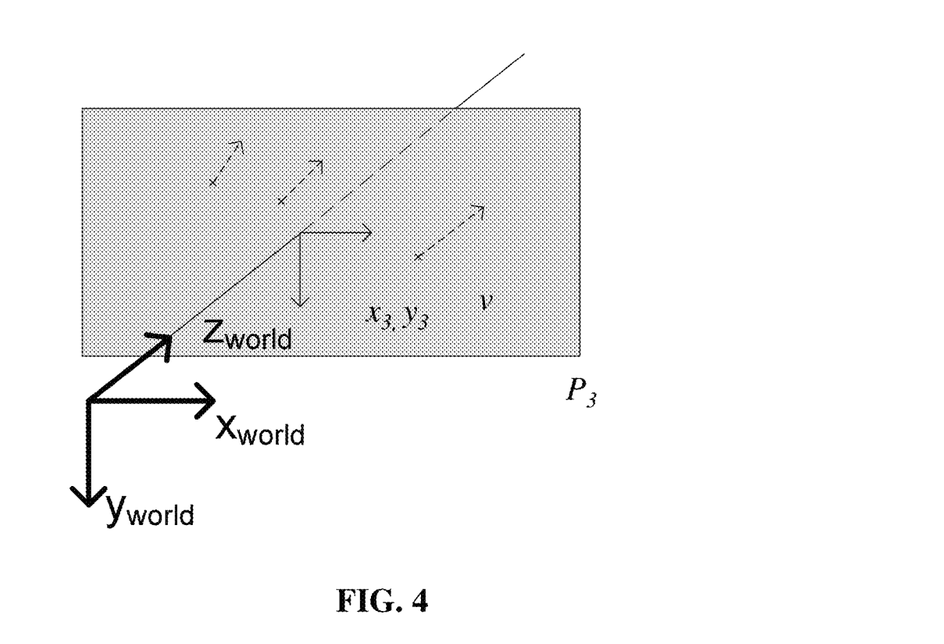
FIG. 4 illustrates a ray of light passing through a reference plane $P_3$ located at known depths.

In a second embodiment represented on FIG. 4, the ray of light is parametrized by means a point of intersection between a reference plane $P_3$ located at known depths $z_3$ and the ray of light. The ray of light intersects the reference plane $P_3$ at depth $z_3$ at intersection point $(x_3, y_3)$. A normalized vector v, which provides the direction of the ray of light in space has the following coordinates: $(v_x, v_y, \sqrt{1-(v_x^2+v_y^2)})$, since $v_z = \sqrt{1-(v_x^2+v_y^2)} v_z$ is assumed to be positive and it can be recalculated knowing $v_x$ and $v_y$, the vector can be described only by its two first coordinates $(v_x, v_y)$.

According to this second embodiment, the ray of light may be identified by four coordinates $(x_3, y_3, v_x, v_y)$. The light-field can thus be parameterized by a reference plane for parameterization $P_3$ also referred herein as parametrization plane, with each ray of light being represented as a point $(x_3, y_3, v_x, v_y) \in \mathbb{R}^4$ in 4D ray space.

Figure 5:
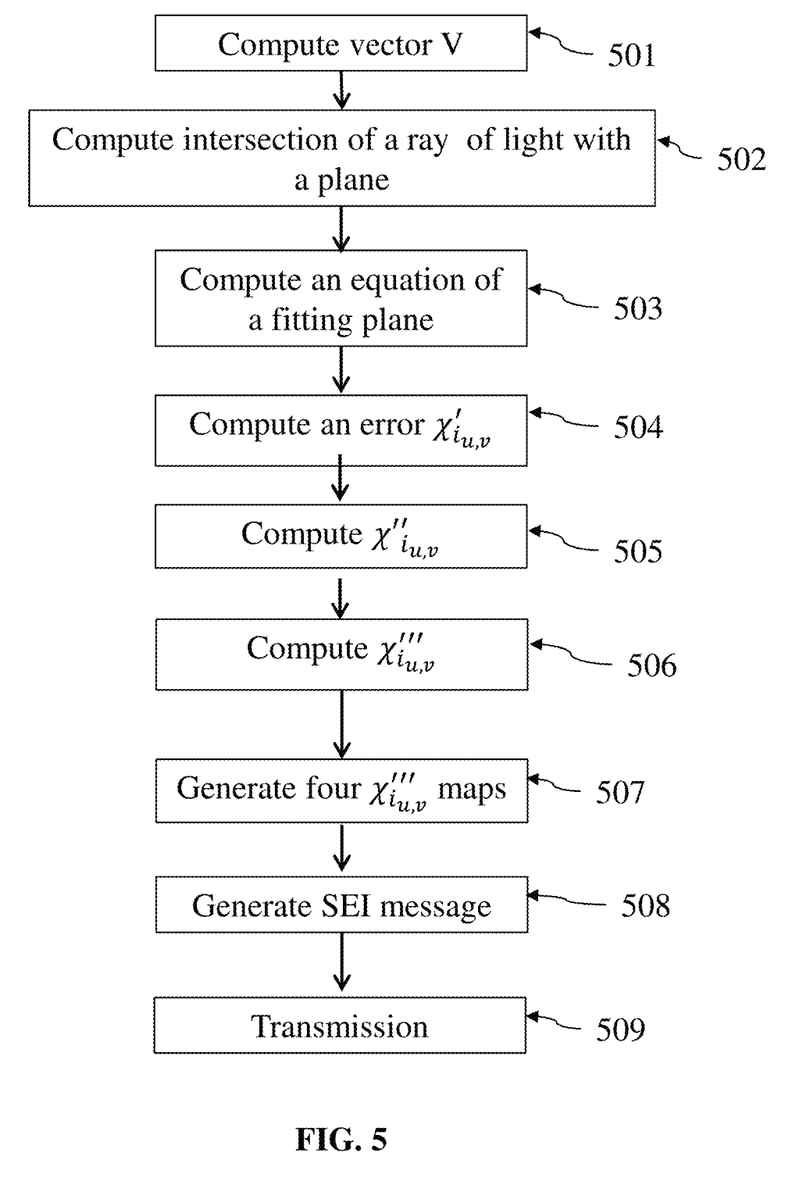
FIG. 5 is a flow chart illustrating the steps of a method for formatting the light-field data according to an embodiment of the invention.

The parameters representing a ray of light in 4D ray space are computed by the light-field data formatting module 150. FIG. 5 is a flow chart illustrating the steps of a method for formatting the light-field data acquired by the camera 100 according to an embodiment of the invention. This method is executed by the light-field data formatting module 150.

In case the light-field acquisition system is calibrated using a pinhole model, the basic projection model, without distortion, is given by the following equation:

$$\begin{pmatrix} u \\ v \\ 1 \end{pmatrix} = 1/Z_c \begin{pmatrix} f & 0 & c_u & 0 \\ 0 & f & c_v & 0 \\ 0 & 0 & 1 & 0 \end{pmatrix} \begin{pmatrix} X_c \\ Y_c \\ Z_c \\ 1 \end{pmatrix} = \begin{pmatrix} f\frac{X_C}{Z_c} + c_u \\ f\frac{Y_C}{z_c} + c_v \\ 1 \end{pmatrix}$$

where
f is the focal length of the main lens of the camera 100,
$c_u$ and $c_v$ are the coordinates of the intersection of the optical axis of the camera 100 with the sensor,
$(X_c, Y_c, Z_c, 1)^T$ is the position in the camera coordinate system of a point in the space sensed by the camera,
$(u, v, 1)^T$ are the coordinates, in the sensor coordinate system, of the projection of the point which coordinates are $(X_c, Y_c, Z_c, 1)^T$ in the camera coordinate system on the sensor of the camera.

In a step 501, the light-field data formatting module 150 computes the coordinates of a vector V representing the direction of the ray of light in space that is sensed by the pixel of the sensor which coordinates are $(u, v, 1)^T$ in the sensor coordinate system. In the sensor coordinate system, the coordinates of vector V are:

$(u-c_u, v-c_v, f)^T$.

In the pinhole model, the coordinates of the intersection of the ray of light sensed by the pixel which coordinates are $(u, v, 1)^T$, with a plane placed at coordinate $Z_1$ from the pinhole and parallel to the sensor plane are:

$\left((u-c_u)\frac{Z_1}{f}, (v-c_v)\frac{Z_1}{f}, Z_1\right)^T$ and are computed during a step 502.

If several acquisitions are mixed, i.e. acquisition of light-field data by different types of cameras, then a single coordinate system is used. In this situation, modifications of coordinates of the points and vectors should be modified accordingly.

According to an embodiment of the invention, the sets of coordinates defining the rays of light sensed by the pixels of the sensor of the camera and computed during steps 501 and 502 are regrouped in maps. In another embodiment, the rays of light are directly computed by a computer-generated scene system that simulates the propagation of rays of light.

In an embodiment of the invention, these maps are associated with a color map of the light-field data to be transmitted to a receiver. Thus in this embodiment, to each pixel (u, v) of the sensor of the camera, parameter representative of the color data associated to a ray of light sensed by a given pixel and a quadruplet of floating point values ($\chi_1$ $\chi_2$ $\chi_3$ $\chi_4$) which correspond either to ($x_1$, $y_1$, $x_2$, $y_2$,) when light-field can thus be parameterized by a pair of reference planes for parameterization $P_1$, $P_2$ or ($x_3$, $y_3$, $v_x$, $v_y$) when the ray of light is parametrized by means of a normalized vector. In the following description, the quadruplet of floating point values ($\chi_1$ $\chi_2$ $\chi_3$ $\chi_4$) is given by:

$$\chi_1 = (u - c_u)\frac{z_1}{f}$$

$$\chi_2 = (v - c_v)\frac{z_1}{f}$$

$$\chi_3 = (u - c_u)\frac{z_2}{f}$$

$$\chi_4 = (v - c_v)\frac{z_2}{f}.$$

In another embodiment, the acquisition system is not calibrated using a pinhole model, consequently the parametrization by two planes is not recalculated from a model. Instead, the parametrization by two planes has to be measured during a calibration operation of the camera. This may be for instance the case for a plenoptic camera which includes in between the main lens and the sensor of the camera a micro-lens array.

In yet another embodiment, these maps are directly simulated by a computer-generated scene system or post-produced from acquired data.

Since a ray of light sensed by a pixel of the sensor of the camera is represented by a quadruplet ($\chi_1$ $\chi_2$ $\chi_3$ $\chi_4$) of floating point, it is possible to put these four parameters into four maps of parameters, e.g. a first map comprising the parameter $\chi_1$ of each ray of light sensed by a pixel of the sensor of the camera, a second map comprising the parameter $\chi_2$, a third map comprising the parameter $\chi_3$ and a fourth map comprising the parameter $\chi_4$. Each of the four above-mentioned maps, called $\chi_i$ maps, have the same size as the acquired light-field image itself but have floating points content.

After some adaptations taking into account the strong correlation between parameters representing rays of light sensed by adjacent pixels and arranging the population of rays of light, and consequently the parameters that represent them, these four maps can be compressed using similar tools as for video data.

In order to compress the values of the floating points ($\chi_1$ $\chi_2$ $\chi_3$ $\chi_4$) and thus reduce the size of the $\chi_i$ maps to be transmitted, the light-field data formatting module 150 computes, in a step 503, for each $\chi_i$ maps an equation of a plane fitting the values of said parameter $\chi_i$ comprised in the $\chi_i$ map. The equation of the fitting plane for the parameter $\chi_i$ is given by:

$$\tilde{\chi}_{i_{(u,v)}} = \alpha_i u + \beta_i v + \gamma_i$$

where u and v are the coordinates of a given pixel of the sensor of the camera.

In a step 504, for each $\chi_i$ map, parameters $\alpha_i$, $\beta_i$, $\gamma_i$ are computed to minimize the error:

$$\|(\chi_{i_{(u,v)}} - \alpha_i u - \beta_i v - \gamma_i)\|.$$

The result of the computation of step 504 is a parameter:

$$\chi'_{i_{u,v}} = \chi_{i_{(u,v)}} - (\alpha_i u + \beta_i v + \gamma_i)$$

that corresponds to the difference of the value of parameter $\chi_i$ with the plane fitting the values of said parameter $\chi_i$, resulting in a much lower range of amplitude of the values comprised in the $\chi_i$ map.

It possible to compress the value $X'_{i_{u,v}}$ by computing $X''_{i_{u,v}} = X'_{i_{u,v}} - \min(X'_{i_{u,v}})$ in a step 505.

Then, in a step 506, a value $X'''_{i_{u,v}}$ of former parameter $\chi_i$ may be computed so that the value of parameter $X'''_{i_{u,v}}$ range from 0 to $2^N - 1$ included, where N is a chosen number of bits corresponding to the capacity of the encoder intend to be used for encoding the light-field data to be sent. The value of the parameter $X'''_{i_{u,v}}$ is given by:

$$\chi'''_{i_{u,v}} = \frac{(2^N - 1) * \chi''_{i_{u,v}}}{\max(\chi''_{i_{u,v}})}$$

In a step 507, the light-field data formatting module 150 generates four maps, $X'''_{1_{u,v}}$ map, $X'''_{2_{u,v}}$ map, $X'''_{3_{u,v}}$ map and $X'''_{4_{u,v}}$ map, corresponding to each of the parameters ($\chi_1$ $\chi_2$ $\chi_3$ $\chi_4$) representing rays of light sensed by the pixels of the sensor of the camera.

In a step 508, the light-field data formatting module 150 generates a SEI (Supplemental Enhancement Information) message comprising the following fixed parameters $\alpha_i$, $\beta_i$, ($\gamma_i + \min(X'_{i_{u,v}})$), $\max(X''_{i_{u,v}})$ intended to be used during reciprocal computation on the receiver side to retrieve the original $\chi_{i_{u,v}}$ maps. These four parameters are considered as metadata conveyed in the SEI message the content of which is given by the following table:

TABLE 1

| Length (bytes) | Name | Comment |
|---|---|---|
| 1 | Message Type | Value should be fixed in MPEG committee |
| 1 | Representation type | '2points coordinates' or 'one point plus one vector' |
| 4 | z1 | Z coordinate of the first plane |
| 4 | z2 | if type = '2points coordinates', Z coordinate of the second plane |
| 4 | alpha_1 | plane coefficient α |
| 4 | beta_1 | plane coefficient β |
| 4 | gamma_1 | plane coefficient γ + min($\chi'_{u,v}$) |
| 4 | max_1 | max($\chi''_{u,v}$) |
| 4 | alpha_2 | plane coefficient α |
| 4 | beta_2 | plane coefficient β |
| 4 | gamma_2 | plane coefficient γ + min($\chi'_{u,v}$) |
| 4 | max_2 | max($\chi''_{u,v}$) |
| 4 | alpha_3 | plane coefficient α |
| 4 | beta_3 | plane coefficient β |
| 4 | gamma_3 | plane coefficient γ + min($\chi'_{u,v}$) |
| 4 | max_3 | max($\chi''_{u,v}$) |
| 4 | alpha_4 | plane coefficient α |

TABLE 1-continued

| Length (bytes) | Name | Comment |
|---|---|---|
| 4 | beta_4 | plane coefficient β |
| 4 | gamma_4 | plane coefficient γ + min($\chi'_{u,v}$) |
| 4 | max_4 | max($\chi''_{i_{u,v}}$) |

On the receiver side, the reciprocal computation enabling to retrieve the original $\chi_{i_{u,v}}$ maps is given by $$\chi''_{i_{u,v}} = \chi'''_{i_{u,v}} \frac{\max(\chi''_{i_{u,v}})}{2^N}$$

$$\chi_{i_{u,v}} = \chi''_{i_{u,v}} + \alpha_i u + \beta_i v + (\gamma_i + \min(\chi'_{i_{u,v}})). \qquad \text{ii.}$$

In a step 509, the $X'''_{i_{u,v}}$ maps, the color map and the SEI message are transmitted to at least a receiver where these data are processed in order to render a light-filed content.

It possible to further decrease the size of the maps representing the light-field data before their transmission to a receiver. The following embodiments are complementary of the one consisting of minimizing the error $$\|(\chi_{i_{u,v}} - \alpha_i u - \beta_i v - \gamma_i)\|.$$

Figure 6:
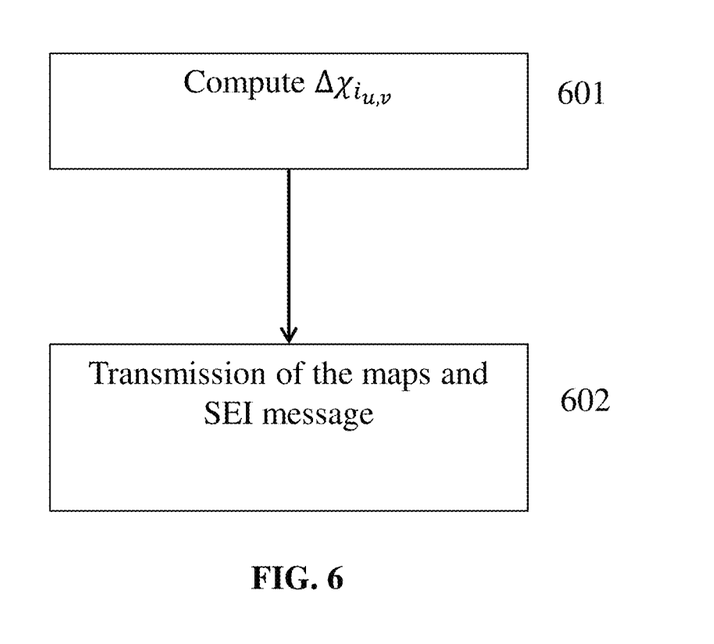
FIG. 6 is a flow chart illustrating the steps of a method for formatting the light-field data according to an embodiment of the invention.

In a first embodiment represented on FIG. 6, as the $\chi_{i_{u,v}}$ maps contain values with low spatial frequencies, it is possible to transmit only the derivative of a signal in a direction in space.

For example, given $\chi_{i_{0,0}}$, the value of parameter $\chi_i$ associated to the pixel of coordinates (0,0), the light-field data formatting module 150 computes, in a step 601, the difference $\Delta\chi_{i_{1,0}}$ between the value $\chi_{i_{1,0}}$ of parameter $\chi_i$ associated to the pixel of coordinates (1,0) and the value $\chi_{i_{0,0}}$ of parameter $\chi_i$ associated to the pixel of coordinates (0,0):

$$\Delta\chi_{i_{1,0}} = \chi_{i_{1,0}} - \chi_{i_{0,0}}$$

More generally, during step 601, the light-field data formatting module 150 computes a difference between a value of parameter $\chi_i$ associated to a given pixel of the sensor and a value of parameter $\chi_i$ associated to another pixel preceding the given pixel in a row of the sensor of the optical acquisition system or of a computer-generated scene system:

$$\Delta\chi_{i_{u+1,v}} = \chi_{i_{u+1,v}} - \chi_{i_{u,v}}.$$

When the given pixel is the first pixel of a row of the sensor, the light-field data formatting module 150 computes a difference between a value of parameter $\chi_i$ associated to the given pixel and a value of parameter $\chi_i$ associated to the first pixel of a row preceding the row to which the given pixel belongs:

$$\Delta\chi_{i_{0,v+1}} = \chi_{i_{0,v+1}} - \chi_{i_{0,v}}.$$

In a step 602, the $\Delta\chi_{i_{u,v}}$ maps, the color map and the SEI message, generated during step 508, are transmitted to at least a receiver where these data are processed in order to render a light-filed content.

In a second embodiment, as the $\chi_{i_{u,v}}$ maps, $X'''_{i_{u,v}}$ maps or $\Delta\chi_{i_{u,v}}$ maps contain values having very slow spatial frequencies, it is possible to perform a spatial down-sampling in both dimensions of the $\chi_{i_{u,v}}$ map and then to recover the entire $\chi_{i_{u,v}}$ map on the receiver side by making a linear interpolation between transmitted samples of said $\chi_{i_{u,v}}$ maps.

For instance if we can reduce the size of the maps from N_rows*M_columns to from N_rows/2*M_columns/2. At reception the maps can be extended to original size; the created holes can be filled by an interpolation method (or so-called up-sampling process). A simple bilinear interpolation is generally sufficient $$\chi_{i_{u,v}} = (\chi_{i_{u-1,v-1}} + \chi_{i_{u+1,v-1}} + \chi_{i_{u-1,v+1}} + \chi_{i_{u+1,v+1}})/4$$

Figure 7:
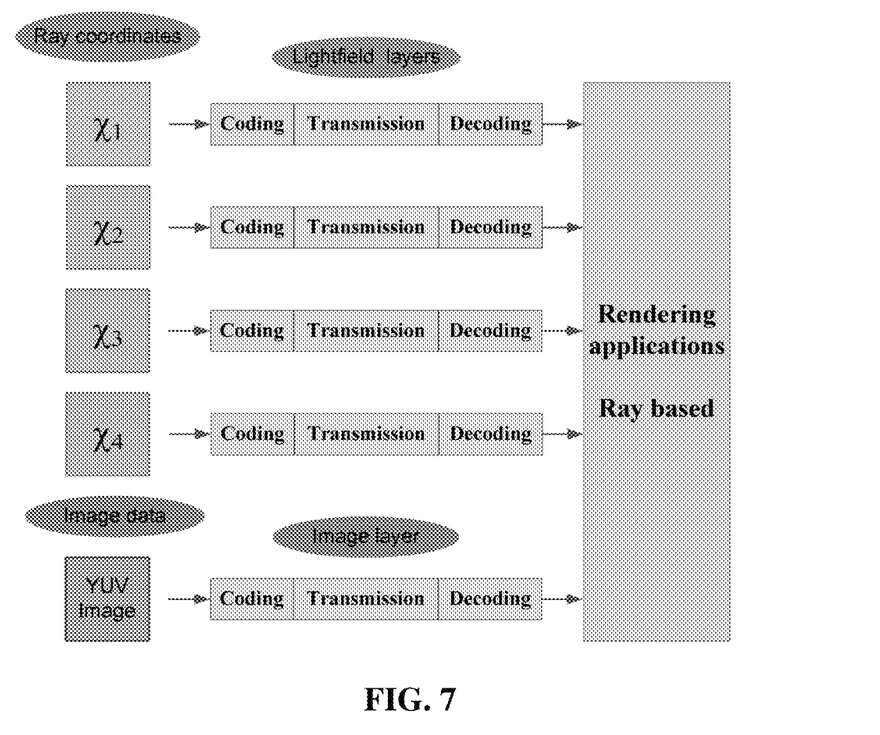
FIG. 7 represents the $\chi_{i_{u,v}}$ maps, $\chi'''_{i_{u,v}}$ maps or $\Delta\chi_{i_{u,v}}$ maps when transmitted to a receiver using four independent monochrome codecs.

In a third embodiment represented on FIG. 7, each $\chi_{i_{u,v}}$ maps, $X'''_{i_{u,v}}$ maps or $\Delta\chi_{i_{u,v}}$ maps may be transmitted to a receiver using four independent monochrome codecs, such as h265/HEVC for example.

Figure 8:
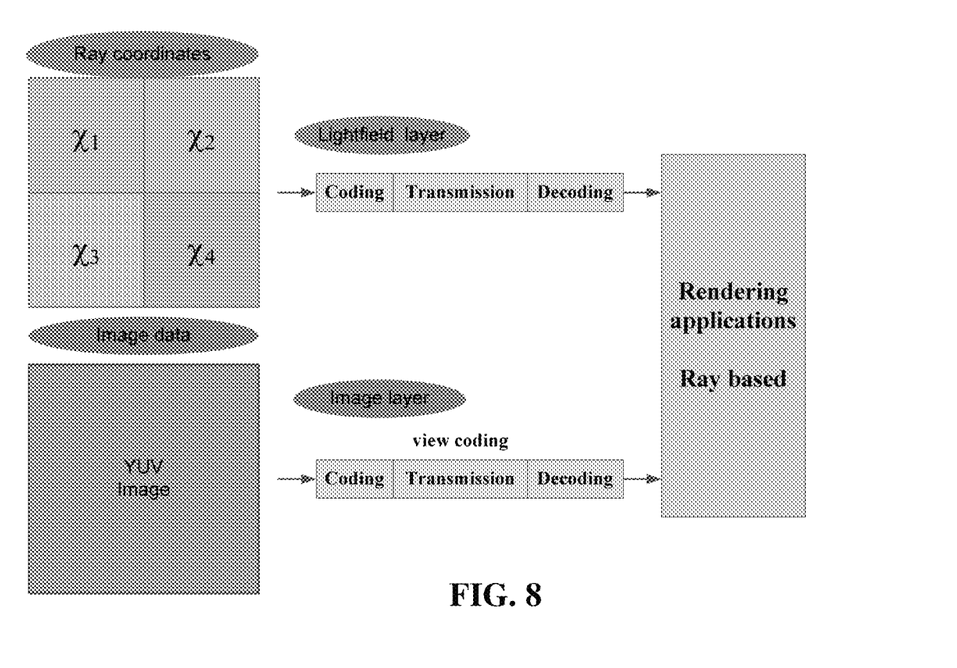
FIG. 8 represents the $\chi_{i_{u,v}}$ maps, $\chi'''_{i_{u,v}}$ maps or $\Delta\chi_{i_{u,v}}$ maps when grouped in a single image.

In a fourth embodiment, the $\chi_{i_{u,v}}$ maps, $X'''_{i_{u,v}}$ maps or $\Delta\chi_{i_{u,v}}$ maps may be grouped in a single image as represented on FIG. 8. In order to reach this goal, one method consists in reducing the size of the maps by a factor 2 using the subsampling method, as in the second embodiment, and then in joining the $\chi_{i_{u,v}}$ maps, $X'''_{i_{u,v}}$ maps or $\Delta\chi_{i_{u,v}}$ maps each in a quadrant of an image having the same size as the color map. This method is usually named "frame packing" as it packs several frame into a single one. Adequate meta-data should be transmitted, for instance in the SEI message, to signal the way the frame packing has been performed such that the decoder can adequately unpack the frames. The packed maps into a single frame can be then transmitted using a single monochrome codec, such as, but not limited to, H265/HEVC for example In this case, the SEI message as presented in Table 1 must also contain a flag indicating a frame packing method has been used to pack the 4 maps in a single one (refer to Table 1b).

TABLE 1b

| Length (bytes) | Name | Comment |
|---|---|---|
| 1 | Message Type | Value should be fixed in MPEG committee |
| 1 | Representation type | '2points coordinates' or 'one point plus one vector' |
| 4 | z1 | Z coordinate of the first plane |
| 4 | z2 | if type = '2points coordinates', Z coordinate of the second plane |
| 1 | Packing mode | 0: means no frame packing (separated single maps); 1: means frame packing (single 4 quadrants map) |
| 4 | alpha_1 | plane coefficient α |
| 4 | beta_1 | plane coefficient β |
| 4 | gamma_1 | plane coefficient γ + min($\chi'_{u,v}$) |
| 4 | max_1 | max($\chi''_{u,v}$) |
| 4 | alpha_2 | plane coefficient α |
| 4 | beta_2 | plane coefficient β |
| 4 | gamma_2 | plane coefficient γ + min($\chi'_{u,v}$) |
| 4 | max_2 | max($\chi''_{u,v}$) |
| 4 | alpha_3 | plane coefficient α |
| 4 | beta_3 | plane coefficient β |
| 4 | gamma_3 | plane coefficient γ + min($\chi'_{u,v}$) |
| 4 | max_3 | max($\chi''_{u,v}$) |
| 4 | alpha_4 | plane coefficient α |
| 4 | beta_4 | plane coefficient β |
| 4 | gamma_4 | plane coefficient γ + min($\chi'_{u,v}$) |
| 4 | max_4 | max($\chi''_{u,v}$) |

When several cameras are grouped to form a rig, it is better and more consistent to define a single world coordinate system and 2 parametrization planes common for all the cameras. Then the description message (SEI for instance) can contain common information (representation type, z1 and z2) plus the description parameters of the 4 maps ($\chi_{i_{u,v}}$ maps, $X'''_{i_{u,v}}$ maps or $\Delta\chi_{i_{u,v}}$) for each camera as shown in table 2.

In that case $\chi_{i_{u,v}}$ maps, $X'''_{i_{u,v}}$ maps or $\Delta\chi_{i_{u,v}}$ maps may be transmitted to a receiver using monochrome codecs taking into account the multi-view aspect of the configuration such as MPEG Multiview Video coding (MVC) or MPEG Multiview High Efficiency Video Coding (MV-HEVC) for example.

TABLE 2

| Length (bytes) | Name | Comment |
|---|---|---|
| 1 | Message Type | Value should be fixed in MPEG committee |
| 1 | Representation type | '2points coordinates' or 'one point plus one vector' |
| 4 | z1 | Z coordinate of the first plane |
| 4 | z2 | if type = '2points coordinates', Z coordinate of the second plane |
| | | For each set of 4 component maps |
| 1 | Packing mode | 0: means no frame packing (single map); 1: means frame packing (4 quadrants) |
| 4 | alpha_1 | plane coefficient α |
| 4 | beta_1 | plane coefficient β |
| 4 | gamma_1 | plane coefficient γ + min($\chi'_{u,v}$) |
| 4 | max_1 | max($\chi''_{i_{u,v}}$) |
| 4 | alpha_2 | plane coefficient α |
| 4 | beta_2 | plane coefficient β |
| 4 | gamma_2 | plane coefficient γ + min($\chi'_{u,v}$) |
| 4 | max _2 | max($\chi''_{i_{u,v}}$) |
| 4 | alpha_3 | plane coefficient α |
| 4 | beta_3 | plane coefficient β |
| 4 | gamma_3 | plane coefficient γ + min($\chi'_{u,v}$) |
| 4 | max _3 | max($\chi''_{i_{u,v}}$) |
| 4 | alpha_4 | plane coefficient α |
| 4 | beta_4 | plane coefficient β |
| 4 | gamma_4 | plane coefficient γ + min($\chi'_{u,v}$) |
| 4 | max_4 | max($\chi''_{i_{u,v}}$) |

In a fifth embodiment, when modifications of the $\chi_{i_{u,v}}$ maps, $X'''_{i_{u,v}}$ maps or $\Delta\chi_{i_{u,v}}$ maps are null during a certain amount of time, these $\chi_{i_{u,v}}$ maps, $X'''_{i_{u,v}}$ maps or $\Delta\chi_{i_{u,v}}$ are marked as skipped and are not transferred to the receiver. In this case, the SEI message comprises a flag indicating to the receiver that no change has occurred on the $\chi_{i_{u,v}}$ maps, $X'''_{i_{u,v}}$ maps or $\Delta\chi_{i_{u,v}}$ since their last transmission. The content of such a SEI message is shown on table 3:

TABLE 3

| Length (bytes) | Name | Comment |
|---|---|---|
| 1 | Message Type | Value should be fixed in MPEG committee |
| 1 | Skip_flag | 0: means further data are present; 1 means keep previous registered parameters |
| | | If !skip_flag |
| 1 | Representation type | '2points coordinates' or 'one point plus one vector' |
| 4 | z1 | Z coordinate of the first plane |
| 4 | z2 | if type = '2points coordinates', Z coordinate of the second plane |
| | | For each quadrant |
| 1 | Packing mode | 0: means no frame packing (single map); 1: means frame packing (4 quadrants) |
| 4 | alpha_1 | plane coefficient α |
| 4 | beta_1 | plane coefficient β |
| 4 | gamma_1 | plane coefficient γ + min($\chi'_{u,v}$) |
| 4 | max_1 | max($\chi''_{i_{u,v}}$) |
| 4 | alpha_2 | plane coefficient α |
| 4 | beta_2 | plane coefficient β |
| 4 | gamma_2 | plane coefficient γ + min($\chi'_{u,v}$) |
| 4 | max_2 | max($\chi''_{i_{u,v}}$) |

TABLE 3-continued

| Length (bytes) | Name | Comment |
|---|---|---|
| 4 | alpha_3 | plane coefficient α |
| 4 | beta_3 | plane coefficient β |
| 4 | gamma_3 | plane coefficient γ + min($\chi'_{u,v}$) |
| 4 | max_3 | max($\chi''_{i_{u,v}}$) |
| 4 | alpha_4 | plane coefficient α |
| | beta_4 | plane coefficient β |
| 4 | gamma_4 | plane coefficient γ + min($\chi'_{u,v}$) |
| 4 | max_4 | max($\chi''_{i_{u,v}}$) |

In a sixth embodiment, as the modifications of acquisition system parameters, represented in the $\chi_{i_{u,v}}$ maps, $X'''_{i_{u,v}}$ maps or $\Delta\chi_{i_{u,v}}$, are slowly modified in time, it is worthwhile to transmit them to a receiver with a frame rate slower than the frame rate of the color map. The frequency of the transmission of the $\chi_{i_{u,v}}$ maps, $\chi'''_{i_{u,v}}$ maps or $\Delta\chi_{i_{u,v}}$ must be at least the one of the IDR frames.

In a seventh embodiment, the color maps use the YUV or RGB format and are coded with a video coder such as MPEG-4 AVC, h265/HEVC, or h266, etc. or an image coder such as JPEG, JPEG2000, MJEG. When several cameras are used to acquire the light-field content, color maps may be coded relatively using the MV-HEVC codec.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A method implemented in a device having a processor and memory, the method comprising:
   determining a plurality of light rays, wherein each light ray of the plurality of light rays has a trajectory in three-dimensional space and associated color information;
   for each light ray, determining a first set of parameters representing the trajectory of the light ray and a second set of parameters representing the color information;
   arranging the determined first sets of parameters into a first plurality of images;
   compressing the first plurality of images using one of a first image codec and a first video codec;
   arranging the determined second sets of parameters into a second plurality of images; and
   compressing the second plurality of images using one of a second image codec and a second video codec.

2. The method according to claim 1, wherein:
   each of the determined first sets of parameters represents intersections points of the corresponding light ray with two reference planes in three-dimensional space; or
   each of the determined first sets of parameters represents an intersection point of the corresponding light ray with a reference plane in three-dimensional space and a vector indicating an orientation of the corresponding light ray in three-dimensional space.

3. The method according to claim 1, wherein:
   each of the determined first sets of parameters comprises a plurality of parameters;
   arranging the determined first sets of parameters into a first plurality of images comprises forming the first plurality of images using the plurality of parameters of each of the determined first sets plurality of parameters; and
   a first image of the first plurality of images comprises a first parameter of the plurality of parameters for each light ray of the plurality of light rays.

4. The method according to claim 1, wherein:
   the determined first sets of parameters comprise respective first parameters, second parameters, third parameters, and fourth parameters; and
   arranging the determined first sets of parameters into the first plurality of images comprises:
   arranging the first parameters into a first image of the first plurality of images;
   arranging the second parameters into a second image of the plurality of images;
   arranging the third parameters into a third image of the plurality of images; and
   arranging the fourth parameters into a fourth image of the plurality of images.

5. The computer implemented method according to claim 1, wherein at least one of:
   the one of a first image codec and a first video codec comprises one of a standard image codec and a standard video codec, including any of a joint photographic experts group (JPEG) image codec, a JPEG2000 image codec, an advanced video coding codec, a high efficiency video coding codec, an H.265 video codec, and H.266 video codec;
   the one of a second image codec and a second video codec comprises one of a standard image codec and a standard video codec, including any of a JPEG image codec, a JPEG2000 image codec, an advanced video coding codec, a high efficiency video coding codec, an H.265 video codec, and an H.266 video codec; and
   the one of the first image codec and the first video codec and the one of the second image codec and the second video codec are the same.

6. The method of claim 1, wherein the compressing the first plurality of images comprises:
   combining the first plurality of images into a composite image; and
   coding the composite image using the one of the first image codec and the first video codec.

7. The method of claim 1, wherein:
   each light ray of the plurality of light rays is determined based on light sensed by one or more pixels of at least a sensor of an optical acquisition device; and
   the sensor is a physical sensor device, the optical acquisition device is a physical optical acquisition device, and the plurality of light rays are determined from light entering the physical optical acquisition device; or
   the sensor is a simulated sensor device, the optical acquisition device is a simulated optical acquisition device, and the plurality of light rays are determined from a computer graphics image model; or
   the sensor is a combination of a physical sensor device and a simulated sensor device, the optical acquisition device is a combination of a physical optical acquisition device and a simulated optical acquisition device, and the plurality of light rays are determined from a combination of from light entering the physical optical acquisition device and a computer graphics image (CGI) model.

8. The method of claim 1, comprising coding at least one of:
   a supplemental enhancement information message comprising parameters necessary for reconstructing the light rays from the decoded images; and
   an information message comprising parameters to specify a position for one or more reference planes used to generate the parameters representing the trajectories of the light rays.

9. The method of claim 1, wherein at least one of:
   each light ray of the plurality of light rays is determined based on one or more computer graphics images; and
   the computer graphics images are at least partially simulated by a computer for a given scene description.

10. A device comprising circuitry, including a processor and memory, configured to:
    determine a plurality of light rays, wherein each light ray of the plurality of light rays has a trajectory in three-dimensional space outside the optical acquisition system and associated color information;
    for each light ray, determine a first set of parameters representing the trajectory of the light ray and a second set of parameters representing the color information;
    arrange the determined first sets of parameters into a first plurality of images;
    compress the first plurality of images using one of a first image codec and a first video codec;
    arrange the determined second sets of parameters into a second plurality of images; and
    compress the second plurality of images using one of a second image codec and a second video codec.

11. The device of claim 10, wherein at least one of:
    the one of a first image codec and a first video codec comprises one of a standard image codec and a standard video codec, including any of a joint photographic experts group (JPEG) image codec, a JPEG2000 image codec, an advanced video coding codec, a high efficiency video coding codec, an H.265 video codec, and an H.266 video codec;
    the one of a second image codec and a second video codec comprises one of a standard image codec and a standard video codec, including any of a JPEG image codec, a JPEG2000 image codec, an advanced video coding codec, a high efficiency video coding codec, an H.265 video codec, and an H.266 video codec; and
    the one of the first image codec and the first video codec and the one of the second image codec and the second video codec are the same.

12. The device of claim 10, wherein the device being configured to compress the first plurality of images comprises the device being configured to:
    combine the first plurality of images into a composite image; and
    code the composite image using the one of the first image codec and the first video codec.

13. The device of claim 10, wherein at least one of:
    each light ray of the plurality of light rays is determined based on one or more computer graphics images; and
    the computer graphics images are at least partially simulated by a computer for a given scene description.

14. The device of claim 10, wherein the device is configured to code at least one of:

a supplemental enhancement information message comprising parameters for reconstructing the light rays from the decoded images, and an information message comprising parameters to specify a position for one or more reference planes used to generate the parameters representing the trajectories of the light rays.

15. The device of claim 10, wherein:

each of the determined first sets of parameters represents intersections points of the corresponding light ray with two reference planes in a three-dimensional space; or each of the determined first set of parameters represents an intersection of the corresponding light ray with a reference plane in three-dimensional space and a vector indicating an orientation of the light ray in three-dimensional space.

16. The device of claim 10, wherein:

each of the determined first sets of parameters comprises a plurality of parameters;

the device being configured to arrange the determined first sets of parameters into a first plurality of images comprises the device being configured to form the first plurality of images using the plurality of parameters of each of the determined first sets plurality of parameters; and a first image of the first plurality of images comprises a first parameter of the plurality of parameters for each light ray of the plurality of light rays.

17. The device of claim 10, wherein:

the determined first sets of parameters comprise respective first parameters, second parameters, third parameters, and fourth parameters; and the device being configured to arrange the determined first sets of parameters into a first plurality of images comprises the device being configured to:

arrange the first parameters into a first image of the plurality of images;

arrange the second parameters into a second image of the plurality of images;

arrange the third parameters into a third image of the plurality of images; and arrange the fourth parameters into a fourth image of the plurality of images.

18. The device of claim 10, wherein:

each light ray of the plurality of light rays is determined based on light sensed by one or more pixels of at least a sensor of an optical acquisition device; and the sensor is a physical sensor device, the optical acquisition device is a physical optical acquisition device, and the plurality of light rays are determined from light entering the physical optical acquisition device; or the sensor is a simulated sensor device, the optical acquisition device is a simulated optical acquisition device, and the plurality of light rays are determined from a computer graphics image (CGI) model; or the sensor is a combination of a physical sensor device and a simulated sensor device, the optical acquisition device is a combination of a physical optical acquisition device and a simulated optical acquisition device, and the plurality of light rays are determined from a combination of from light entering the physical optical acquisition device and a computer graphics image (CGI) model.

19. The device according to claim 10, wherein each light ray of the plurality of light rays is determined based on light sensed by one or more pixels of at least a sensor of an optical acquisition device, and wherein each of the trajectories is a trajectory in three-dimensional space outside the optical acquisition device.

20. The method according to claim 1, wherein each light ray of the plurality of light rays is determined based on light sensed by one or more pixels of at least a sensor of an optical acquisition device, and wherein each of the trajectories is a trajectory in three-dimensional space outside the optical acquisition device.

* * * * *